Patented Apr. 23, 1935

1,998,563

UNITED STATES PATENT OFFICE 1,998,563

SULPHONIC ACID OF THE BENZENE SERIES

Richard Stüsser, Cologne-Deutz-on-the-Rhine, Germany, assignor to General Aniline Works, Inc., New York, N. Y., a corporation of Delaware No Drawing. Application December 10, 1932, Serial No. 646,720. In Germany December 14, 1931

5 Claims. (Cl. 260—124)

The present invention relates to new sulphonic acids of the benzene series, more particularly it relates to compounds which may be represented by the probable general formula

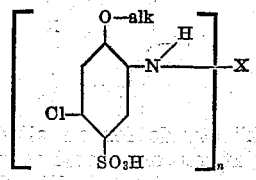

wherein "alk" stands for an alkyl group, "X" stands for hydrogen or an acyl group, such as a radical of an aliphatic or aromatic carboxylic acid, for instance, acetyl, benzoyl, aceto-acetyl, aceto-benzoyl, and "n" stands for the members one or two in such a manner that "n" can be two only in case "X" stands for acyl.

My new sulphonic acids of the benzene series are obtainable by sulphonating a benzene compound of the general formula

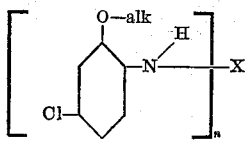

wherein "alk", "X" and "n" are to be declared as stated above with of the usual sulphonating agents, such as oleum or sulphuric acid monohydrate. The sulphonation proceeds smoothly and can be performed for example in monohydrate already at temperatures between about 40 and about 50° C. It is surprising that in the sulphonation process the alkyl group of the alkoxy group is not split off as is often the case when suphonating compounds containing as substituents alkoxy groups.

My new sulphonic acids are generally colorless substances, difficultly to easily soluble in water, forming well crystalizing watersoluble alkali metal salts, and being valuable intermediate products in the manufacture of dyestuffs.

The following examples serve to illustrate my invention, without limiting it thereto:

Example 1.—100 grams of 5-chloro-2-amino-1-methoxybenzene are stirred in 800 grams of sulphuric acid monohydrate at a temperature between 40 and 50° C. until from a test portion which has been diluted with water 5-chloro-2-amino-1-methoxybenzene is no more precipitated by the addition of aqueous caustic soda. The sulphonation mixture is then poured onto ice whereby the sulphonic acid formed separates in a crystallized form. The 5-chloro-2-amino-1-methoxybenzene-4-sulphonic acid of the formula

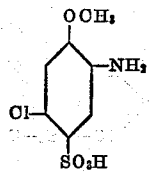

is filtered with suction, washed with water and dried. The new sulphonic acids forms well crystallizing alkali metals which can be recrystallized from water.

The 1-methoxy-2-acetylamino-5-chloro-benzene-4-sulphonic acid prepared in an analogous manner is more easily soluble in water, the 1-methoxy-2-benzoylamino-5-chloro-benzene - 4 - sulphonic acid is more difficultly soluble in water.

Example 2.—100 grams of 5-chloro-2-aceto-acetylamino-1-methoxybenzene are introduced gradually with stirring into 400 grams of a sulphuric acid containing 20% of $SO_3$ at a temperature of 10° C. When the 5-chloro-2-aceto-acetyl-amino-1-methoxybenzene has been dissolved, the mass is further stirred for some time, until from a test portion diluted with water, 5-chloro-2-aceto-acetylamino-1-methoxybenzene is no more precipitated by the addition of aqueous soda solution. The working up is performed as described in Example 1.

The 1-methoxy-5-chloro-2-aceto-acetylamino-4-sulphonic acid of the formula

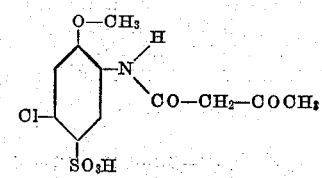

is scarcely soluble in cold water and forms alkali metal salts which are difficultly soluble in water and can be recrystallized from the same.

Example 3.—100 grams of 5-chloro-2-aceto-acetylamino-1-ethoxybenzene are introduced while stirring into 400 grams of sulphuric acid containing 20% of $SO_3$ at a temperature of 20° C. After all has been introduced, the mass is heated for some time at 30° C. until all has dissolved and a test portion yields a clear solution when adding an aqueous soda solution. When the sulphonation is complete, the reaction mixture is cooled down to zero, and the working up is performed as described in Example 1. The 5-chloro-2-acetoacetylamino-4-ethoxybenzene-4-sulphonic acid of the formula

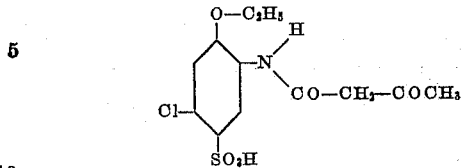

is difficultly soluble in cold water; it forms well crystallizing alkali metal salts which can be recrystallized from water. With diazo compounds it couples with the formation of azo dyestuffs.

Example 4.—100 grams of 5-chloro-2-benzoyl acetylamino-1-methoxybenzene are introduced while stirring into 500 grams of sulphuric acid containing 20% of $SO_3$ and stirred for some time at a temperature of 25° C. until a test portion yields a clear solution in diluted aqueous soda solution. The working up is performed as described in Example 1. The new sulphonic acid of the formula

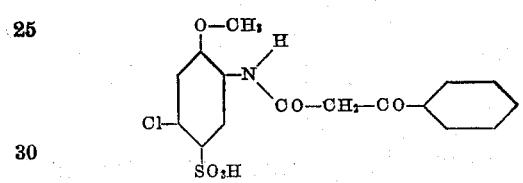

is difficultly soluble in cold water and forms alkali metal salts which can be recrystallized from water. It couples with diazo compounds with the formation of azo dyestuffs.

Example 5.—100 grams of terephthaloyl-bis-(5-chloro-2-acetylamino-1-methoxybenzene) are introduced into 500 grams of sulphuric acid containing 20% of $SO_3$ and heated at a temperature of 30° C. until a test portion yields a clear solution in dilute aqueous soda solution. The working up is performed as described in Example 1. The new sulphonic acid of the formula

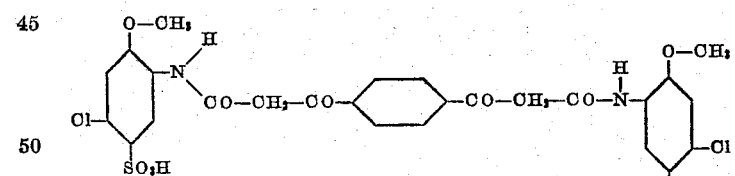

is soluble in hot water and in dilute aqueous alkalies. It couples with diazo compounds with the formation of azo dyestuffs.

The compound of the formula

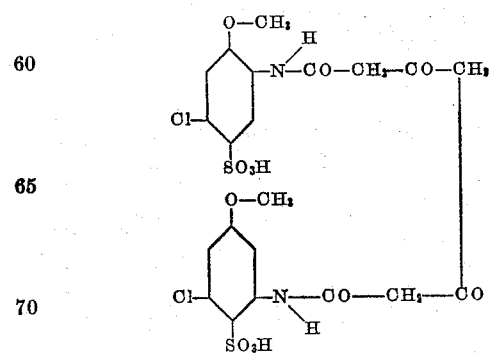

prepared in an analogous manner is somewhat more easily soluble in water and dilute aqueous alkalies.

I claim:
1. The compounds of the general formula

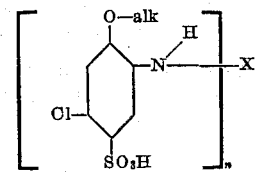

wherein "alk" stands for an alkyl group, "X" stands for hydrogen or an acyl group and "n" stands for one of the numbers one or two in such a manner that "n" can be two only in case "X" stands for acyl, being generally colorless substances, difficultly to easily soluble in water, forming well crystallizing alkali metal salts, and being valuable intermediate products in the manufacture of dyestuffs.

2. The compounds of the general formula

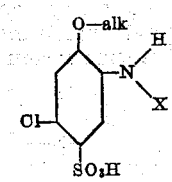

wherein "alk" stands for an alkyl group, "X" stands for hydrogen or an acyl group, being generally colorless substances, difficultly to easily soluble in water, forming well crystallizing alkali metal salts and being valuable intermediate products in the manufacture of dyestuffs 3. The compounds of the general formula

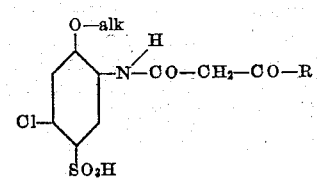

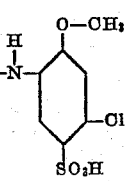

wherein "alk" stands for an alkyl group, and "R" stands for a hydrocarbon radicle of the alkyl or benzene series, being generally colorless substances, difficultly to easily soluble in water, forming well crystallizing alkali metal salts, and being valuable intermediate products in the manufacture of dyestuffs 4. The compound of the formula

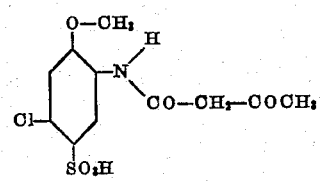

being scarcely soluble in cold water, forming a well crystallizing alkali metal salt and being a valuable intermediate product in the manufacture of dyestuffs.

5. The compound of the formula
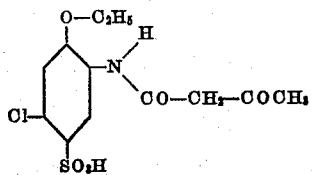
being difficultly soluble in cold water, forming a well crystallizing alkali metal salt and being a valuable intermediate product in the manufacture of dyestuffs.
RICHARD STÜSSER.